United States Patent
Yao et al.

(10) Patent No.: US 12,386,020 B2
(45) Date of Patent: Aug. 12, 2025

(54) METHOD AND APPARATUS FOR POSITIONING A VEHICLE BASED ON UWB

(71) Applicant: AAC Acoustic Technologies (Shanghai) Co., Ltd., Shanghai (CN)

(72) Inventors: Shuhan Yao, Shanghai (CN); Yajun Zheng, Shanghai (CN); Xiaojie Shao, Shanghai (CN); Zhipeng Ye, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 110 days.

(21) Appl. No.: 18/399,765

(22) Filed: Dec. 29, 2023

(65) Prior Publication Data

US 2024/0402285 A1 Dec. 5, 2024

Related U.S. Application Data

(63) Continuation of application No. PCT/CN2023/102067, filed on Jun. 25, 2023.

(30) Foreign Application Priority Data

Jun. 5, 2023 (CN) .......................... 202310658591.0

(51) Int. Cl.
| | |
|---|---|
| *G01S 5/02* | (2010.01) |
| *G01S 5/14* | (2006.01) |
| *H04W 4/024* | (2018.01) |
| *H04W 4/029* | (2018.01) |

(52) U.S. Cl.
CPC ............ *G01S 5/0284* (2013.01); *G01S 5/145* (2013.01); *H04W 4/024* (2018.02); *H04W 4/029* (2018.02); *G01S 2205/02* (2020.05)

(58) Field of Classification Search
CPC .... G01S 5/145; G01S 2205/02; G01S 5/0218; G01S 5/14; G01S 2205/01; G01S 5/0284; H04W 4/024; H04W 4/029
See application file for complete search history.

(56) References Cited

U.S. PATENT DOCUMENTS

| | | | |
|---|---|---|---|
| 2017/0050615 A1* | 2/2017 | Schindler | ................ B60R 25/24 |
| 2019/0168712 A1* | 6/2019 | Yakovenko | ............. B60R 25/24 |
| 2020/0186970 A1* | 6/2020 | Dekovich | ............... H04W 4/40 |
| 2021/0127233 A1* | 4/2021 | Santavicca | ............. H04W 4/40 |

(Continued)

*Primary Examiner* — Sze-Hon Kong
(74) *Attorney, Agent, or Firm* — Wiersch Law Group

(57) ABSTRACT

Provided are a UWB-based method and apparatus for positioning a vehicle. The method includes: receiving, by the UWB module, UWB signals sent by UWB anchors on the vehicle, and acquiring a first relative distance parameter between the intelligent key and the vehicle based on the UWB signals; determining, when the first relative distance parameter is within a first preset distance range, direction information of the vehicle based on the UWB signals; determining, when the first relative distance parameter is within a second preset distance range, relative position information between the intelligent key and the vehicle based on the UWB signals; and outputting vehicle guidance information based on the direction information of the vehicle or the relative position information. A maximum distance parameter in the second preset distance range is less than a minimum distance parameter in the first preset distance range.

10 Claims, 4 Drawing Sheets

(56) References Cited

U.S. PATENT DOCUMENTS

| | | | |
|---|---|---|---|
| 2023/0227003 A1* | 7/2023 | Herman | B60R 25/245 |
| | | | 340/5.72 |
| 2023/0373437 A1* | 11/2023 | Baruco | B60R 25/305 |
| 2024/0010165 A1* | 1/2024 | Shi | G06F 1/3206 |
| 2024/0059248 A1* | 2/2024 | Guo | G07C 9/00309 |
| 2024/0067125 A1* | 2/2024 | Robertson | B60R 25/01 |
| 2024/0175968 A1* | 5/2024 | Badiger | G01S 5/0218 |
| 2024/0208406 A1* | 6/2024 | Shi | G01S 5/0294 |
| 2024/0336226 A1* | 10/2024 | Saiki | H04B 17/318 |
| 2024/0336228 A1* | 10/2024 | Min | B60R 25/24 |
| 2024/0385280 A1* | 11/2024 | Korta | B60R 25/245 |
| 2025/0058741 A1* | 2/2025 | Nimura | B60R 25/01 |

* cited by examiner

METHOD AND APPARATUS FOR POSITIONING A VEHICLE BASED ON UWB

TECHNICAL FIELD

The present disclosure relates to the technical field of communication, and in particular, to method and apparatus for positioning a vehicle based on an ultra-wideband (UWB).

BACKGROUND

With the development of science and technology, high-precision positioning are widely used in scenes such as smart factories, smart homes, and emergency rescue. Outdoors, a global navigation satellite system (GNSS) can provide all-weather and large-area coverage positioning, speed measurement, and timing services, which can meet requirements of most outdoor positioning application scenes. However, indoors, the GNSS has low positioning accuracy and robustness in parking lot application scenes due to low signal power and poor penetration.

It is to be noted that the technologies described in this section are not necessarily those that have been previously envisioned or employed. Unless otherwise indicated, it should not be assumed that any technology described in this section is a prior art merely by virtue of its inclusion in this section. Similarly, unless otherwise indicated, the issues mentioned in this section should not be considered to be recognized in any prior art.

SUMMARY

The present disclosure provides a UWB-based method and apparatus for positioning a vehicle.

In one aspect of the present disclosure, a method for positioning a vehicle based on UWB is provided. The method is applied to an intelligent key that includes a UWB module. The method includes: receiving, by the UWB module, UWB signals sent by UWB anchors configured on the vehicle, and acquiring a first relative distance parameter between the intelligent key and the vehicle based on the UWB signals; determining, when the first relative distance parameter is within a first preset distance range, direction information of the vehicle based on the UWB signals sent by the UWB anchors; determining, when the first relative distance parameter is within a second preset distance range, relative position information between the intelligent key and the vehicle based on the UWB signals sent by the UWB anchors; and outputting guidance information based on the direction information of the vehicle or the relative position information. A maximum distance parameter in the second preset distance range is less than a minimum distance parameter in the first preset distance range.

In another aspect of the present disclosure, an apparatus for positioning a vehicle based on UWB is provided. The apparatus is applied to an intelligent key that includes a UWB module. The apparatus includes: an acquisition module, a first determination module, a second determination module, and an output module. The acquisition module is configured to receive, based on the UWB module, UWB signals sent by UWB anchors configured on the vehicle, and acquire a first relative distance parameter between the intelligent key and the vehicle based on the UWB signals. The first determination module is configured to determine, when the first relative distance parameter is within a first preset distance range, direction information of the vehicle based on the UWB signals sent by the UWB anchors. The second determination module is configured to determine, when the first relative distance parameter is within a second preset distance range, relative position information between the intelligent key and the vehicle based on the UWB signals sent by the UWB anchors. A maximum distance parameter in the second preset distance range is less than a minimum distance parameter in the first preset distance range. The output module is configured to output guidance information based on the direction information of the vehicle or the relative position information.

In yet another aspect of the present disclosure, an intelligent key is provided. The intelligent key includes: a memory, a processor, and a computer program stored in the memory and executable by the processor. The processor, when executing the computer program, performs the method provided in the above aspect of the present disclosure.

In still another aspect of the present disclosure, a non-transitory computer-readable storage medium is provided. The computer-readable storage medium stores a computer program. When the computer program is executed by a processor, the method provided in the above aspect of the present disclosure is performed.

It should be understood that the content described in this section is neither intended to identify key or important features of the present disclosure, nor intended to limit the scope of the present disclosure. Other features of the present application will become readily understood from the following description.

BRIEF DESCRIPTION OF DRAWINGS

The accompanying drawings illustrate embodiments and constitute part of the specification, and together with the literal description of the specification, serve to explain exemplary implementations of the embodiments. The accompanying drawings shown are for illustrative purposes only and do not limit the scope of the claims. In all the accompanying drawings, same reference signs refer to similar but not necessarily identical elements.

DESCRIPTION OF EMBODIMENTS

In order to make the inventive objectives, features, and advantages of the present disclosure more obvious and understandable, the technical solutions in the embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art based on the embodiments in the present disclosure shall fall within the protection scope of the present disclosure.

It should be noted that, in the description of the embodiments of the present disclosure, the terms "first" and "second" are used for descriptive purposes only, which cannot be construed as indicating or implying a relative importance, or implicitly specifying the number of the indicated technical features. Therefore, the features defined with "first" and "second" may explicitly or implicitly include one or more features. In the description of the embodiments of the present disclosure, "a plurality of" means two or more, unless specifically stated otherwise.

In a first embodiment of the present disclosure, a UWB-based vehicle positioning method is provided, and the method is applied to an intelligent key. The intelligent key includes a UWB module. Since the UWB module does not use carrier waves but uses impulses for communication, the intelligent key operates in a digital manner, and the volume, power consumption, weight, anti-multipath interference, and other indexes of the intelligent key have significant advantages compared with other positioning systems.

Figure 1:
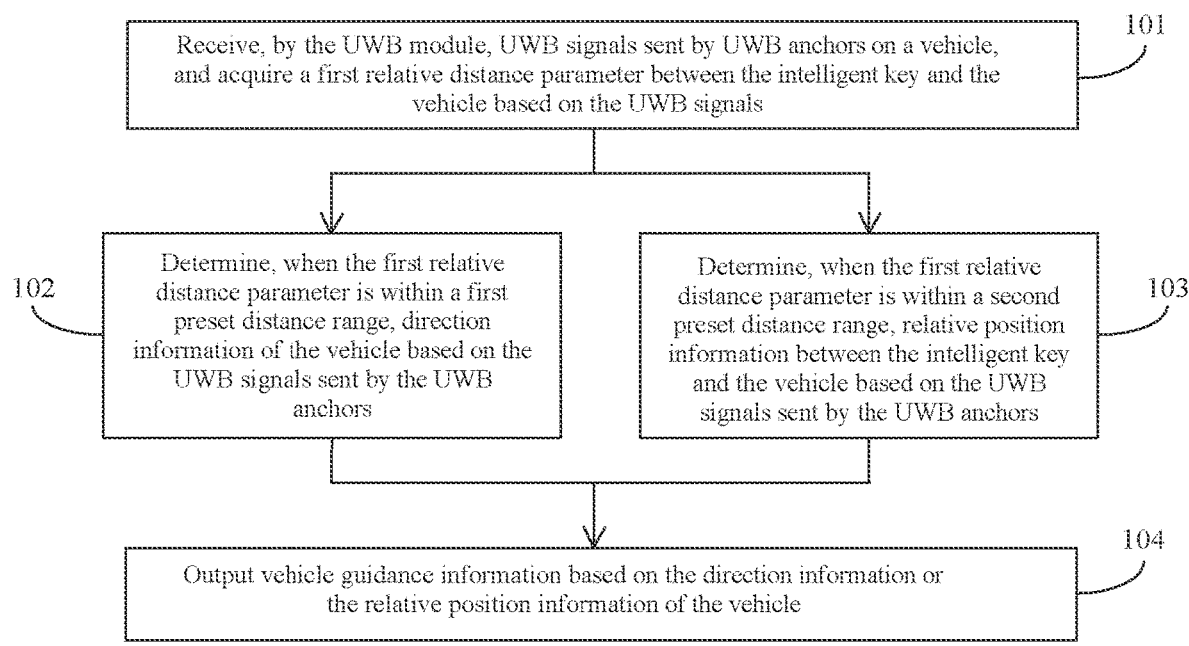
FIG. 1 is a flowchart of method for positioning a vehicle based on UWB according to a first embodiment of the present disclosure.

FIG. 1 is a flowchart of the method for positioning a vehicle based on UWB. The UWB-based vehicle positioning method includes the following steps.

In step 101, UWB signals sent by UWB anchors on a vehicle are received by the UWB module, and a first relative distance parameter between the intelligent key and the vehicle is received based on the UWB signals.

For example, in practical applications, the intelligent key is carried by the owner of the vehicle, and a plurality of UWB anchors may be configured at different positions on the vehicle. For an ordinary vehicle, in this embodiment, five UWB anchors may be configured, four of which are installed at left front, right front, left rear, and right rear positions of the vehicle respectively, and the remaining UWB anchor is installed on the top of the vehicle. Certainly, if the vehicle is larger in size, UWB anchors may be added to the left, the right, and the top of the vehicle respectively.

It is to be noted that the intelligent key is associated with a vehicle belonging to the vehicle owner. When the UWB module of the intelligent key is in a wakeup state, UWB signals are received and then authenticated to determine the UWB signals sent by the UWB anchors configured on the vehicle belonging to the vehicle owner, and then a real-time distance between the intelligent key and the vehicle is acquired based on the signal.

In some embodiments, the intelligent key further includes a Bluetooth low energy (BLE) module. Correspondingly, prior to the step of receiving by the UWB module UWB signals sent by UWB anchors configured on the vehicle, the method further includes: receiving, by the BLE module, a Bluetooth signal sent by a Bluetooth module configured on the vehicle; determining a second relative distance parameter between the intelligent key and the vehicle based on the Bluetooth signal; and causing, when the second relative distance parameter is less than a preset distance threshold, the UWB module to enter a wakeup state. The distance threshold is greater than a maximum distance parameter in the first preset distance range.

For example, in practical applications, if the UWB module of the intelligent key is always in the wakeup state, the intelligent key may consume a lot of power, thereby affecting a battery life of the intelligent key. The UWB module only senses a signal transmitted by an emitter within a limited distance, and unnecessary power consumption may occur when the UWB module is in the wakeup state within a non-sensing distance. In this embodiment, when the UWB module of the intelligent key carried by the vehicle owner and the UWB anchors of the vehicle are not in an effective sensing range since the vehicle owner is relatively far away from the vehicle, distance measurement based on Bluetooth signal may be performed first through the BLE module on the intelligent key to determine whether a distance between the vehicle owner and the vehicle is within the effective sensing distance of the UWB module. If yes, the UWB module on the intelligent key is further triggered to enter the wakeup state. Due to the low power consumption of the BLE module, power consumption of the intelligent key when the distance measurement is performed can be reduced, and the battery life of the intelligent key can be prolonged. It is to be noted that the distance threshold in this embodiment may be a distance value greater than 20 m, for example, 30 m.

In step 102, direction information of the vehicle is determined based on the UWB signals sent by the UWB anchors when the first relative distance parameter is within a first preset distance range.

For example, the first distance range in this embodiment may be less than 20 m and greater than or equal to 10 m. That is, the intelligent key only performs distance monitoring within a distance range greater than 20 m, and when it is determined that a relative distance between the intelligent key and the vehicle is within a distance range less than 20 m and greater than 10 m, the intelligent key determines a direction of the vehicle through the UWB signals sent by the UWB anchors and provides vehicle direction guidance for the vehicle owner in real time. It is to be noted that, when the relative distance between the intelligent key and the vehicle is within a distance range greater than 20 m, a signal sending and receiving frequency of the UWB module is a first frequency, and when the relative distance between the intelligent key and the vehicle is within a distance range less than or equal to 20 m, the signal sending and receiving frequency of the UWB module is a second frequency. The first frequency is less than the second frequency. Therefore, power consumption of the intelligent key can be reduced in long-distance scenes, and positioning accuracy can be improved in short-distance scenes.

In step 103, relative position information between the intelligent key and the vehicle is determined based on the UWB signals sent by the UWB anchors when the first relative distance parameter is within a second preset distance range.

For example, in this embodiment, a maximum distance parameter in the second preset distance range is less than or equal to a minimum distance parameter in the first preset distance range. For example, if the first preset distance range is less than 20 m and greater than or equal to 10 m, the second preset distance range may be less than 10 m. In this embodiment, when the vehicle owner moves closer to the vehicle according to the vehicle direction guidance and is at a relative closer distance to the vehicle, the intelligent key acquires a relative position between the intelligent key and the vehicle in real time based on the UWB signals sent by the UWB anchors. The intelligent key provides, for the vehicle owner, more accurate vehicle positioning guidance through the relative position.

In some embodiments, the step of determining relative position information between the intelligent key and the vehicle based on the UWB signals sent by the UWB anchors includes: acquiring time of flight (TOF) parameters between the intelligent key and the UWB anchors; estimating preliminary position information based on the TOF distance parameters; and determining the relative position information between the intelligent key and the vehicle according to the preliminary position information.

In this embodiment, in the estimation of the preliminary position information, the below calculation formula may be used.

$$\sqrt{(x-x_i)^2 + (y-y_i)^2} = d_i$$

In the calculation formula, $(x_i, y_i)$ denotes coordinate information of an $i^{th}$ UWB anchor, $d_i$ denotes a TOF distance parameter of the $i^{th}$ UWB anchor, and $(x, y)$ denotes preliminary position information. In this embodiment, the above formula is linearized and then the least squares method to obtain the estimated preliminary position information may be obtained by using a least square method:

$$X_0 = \begin{bmatrix} x \\ y \end{bmatrix}.$$

In some embodiments, the step of determining the relative position information between the intelligent key and the vehicle according to the preliminary position information includes: acquiring weight coefficients of the UWB anchors; and determining the relative position information between the intelligent key and the vehicle based on the weight coefficients and the preliminary position information.

It is to be noted that, in this embodiment, the weight coefficients of the UWB anchors may be acquired by, but are not limited to, the following three manners.

In the first manner, data groups are matched with a preset correlation curve, and the corresponding weight coefficients are assigned according to degrees of fitting between the data groups and the preset correlation curve. Each data group includes a received signal strength indication (RSSI) of the UWB signal sent by the UWB anchor and the TOF distance parameter of the UWB anchor, and the correlation curve represents a corresponding relationship between reference distances and RSSIs.

In the case of a line-of-sight error, a RSSI is equal to a difference between transmit power and a path loss. In an open environment, a "distance-RSSI" correlation curve may be roughly set, and then a "distance" and an "RSSI" of an actual received signal are matched with the curve. If a degree of fitting between the curve and the "distance" and an "RSSI" of the actual received signal is poor, a lower weight may be assigned accordingly.

In the second manner, channel impulse response (CIR) features are acquired based on the UWB signals sent by the UWB anchors, and the weight coefficients of the UWB anchors are determined according to the CIR features of the UWB anchors.

For example, it is determined, by analyzing features of a CIR signal in different conditions, whether a non-line-of-sight error occurs. If the non-line-of-sight error occurs, a lower weight coefficient is assigned.

In the third manner, estimated distance parameters between the intelligent key and the UWB anchors are calculated based on the preliminary position information, distance residuals are calculated based on the estimated distance parameters and the corresponding TOF distance parameters, and the weight coefficients are determined according to the distance residuals corresponding to the UWB anchors.

For example, a distance between a current position of the intelligent key and each anchor may be estimated through the foregoing preliminary position estimation, and a difference between the distance and an initially received TOF distance is a residual. A residual calculation formula is expressed as: $Res = |D_i - d_i|$, where $D_i$ denotes an estimated distance between a preliminary position and each anchor, and $d_i$ denotes a received TOF distance. If Res is greater, a lower weight coefficient is assigned.

It should be understood that, in addition to the single-factor-based weight coefficient determination manners mentioned in the above three manners, a multiple-factor-based weight coefficient determination manner may also be adopted in this embodiment. That is, the weight coefficients are determined based on the degrees of fitting, the CIR features, and the distance residuals described above.

In some embodiments, the step of determining the relative position information between the intelligent key and the vehicle based on the weight coefficients and the preliminary position information includes: inputting the weight coefficients and the preliminary position information to a preset weighted iterative equation for calculation, to obtain first relative position information between the intelligent key and the vehicle; and performing Kalman filtering on the first relative position information to obtain second relative position information.

For example, the iterative equation in this embodiment may be expressed as follows:

$$f(X) = f(x, y) = \sqrt{(x-x_i)^2 + (y-y_i)^2} - d_i = 0$$

A Kalman filtering formula in this embodiment may be expressed as follows:

$$\begin{cases} \bar{x} = Ax \\ d_k = Z_t - H\bar{x} \\ \bar{P} = APA^T + Q \\ K_c = \bar{P}H^T(H\bar{P}H^T + R)^{-1} \\ x = \bar{x} + K_t d_k \\ P = (I - K_t H) * \bar{P} \end{cases}$$

In practical applications, lower observation noise R indicates a poor filtering effect. If the observation noise R is high, a filtering result may have poor tracking performance and the actual motion state may be lost. The observation noise R is associated with the weight calculated previously, and a different weight is set in each step to make a trade-off between effectiveness of filtering and good tracking performance.

In step 104, vehicle guidance information is outputted based on the direction information of the vehicle or the relative position information.

In this embodiment, when the relative distance between the intelligent key and the vehicle is within the first preset distance range, direction guidance information is outputted to the vehicle owner in real time based on the direction information of the vehicle. The vehicle owner approaches the vehicle based on the direction guidance information so that the relative distance between the intelligent key and the vehicle is within the second preset distance range. When the relative distance between the intelligent key and the vehicle is within the second preset distance range, position guidance information is further outputted based on the relative position information between the intelligent key and the vehicle to guide the vehicle owner to the position of the vehicle.

It is to be noted that, subsequent to the step of outputting vehicle guidance information based on the direction information of the vehicle or the relative position information, the method further includes: enabling a passive-entry-passive-start (PEPS) function when the first relative distance parameter is within a third preset distance range. In this embodiment, a maximum distance parameter in the third preset distance range is less than a minimum distance parameter in the second preset distance range. In practical applications, the third preset distance range may be a distance range less than one meter.

In addition, the intelligent key in this embodiment may further includes a near field communication (NFC) module for extreme situations such as the intelligent key running out of power. At the same time, the UWB anchors may be reused to implement CIR-based live body detection and trunk kicking functions.

According to the UWB-based vehicle positioning method provided in this embodiment, UWB signals sent by UWB anchors on a vehicle are received by a UWB module, and a first relative distance parameter between the intelligent key and the vehicle are acquired based on the UWB signals. When the first relative distance parameter is within a first preset distance range, direction information of the vehicle is determined based on the UWB signals sent by the UWB anchors. When the first relative distance parameter is within a second preset distance range, relative position information between the intelligent key and the vehicle is determined based on the UWB signals sent by the UWB anchors. A maximum distance parameter in the second preset distance range is less than a minimum distance parameter in the first preset distance range. Vehicle guidance information is outputted based on the direction information of the vehicle or the relative position information. In the present disclosure, a UWB technology with strong penetration and a good anti-multipath reflection effect is used for vehicle searching and guidance, which has high positioning accuracy and good robustness in covered parking lot application scenes, ensuring effectiveness of vehicle searching and guidance.

Figure 2:
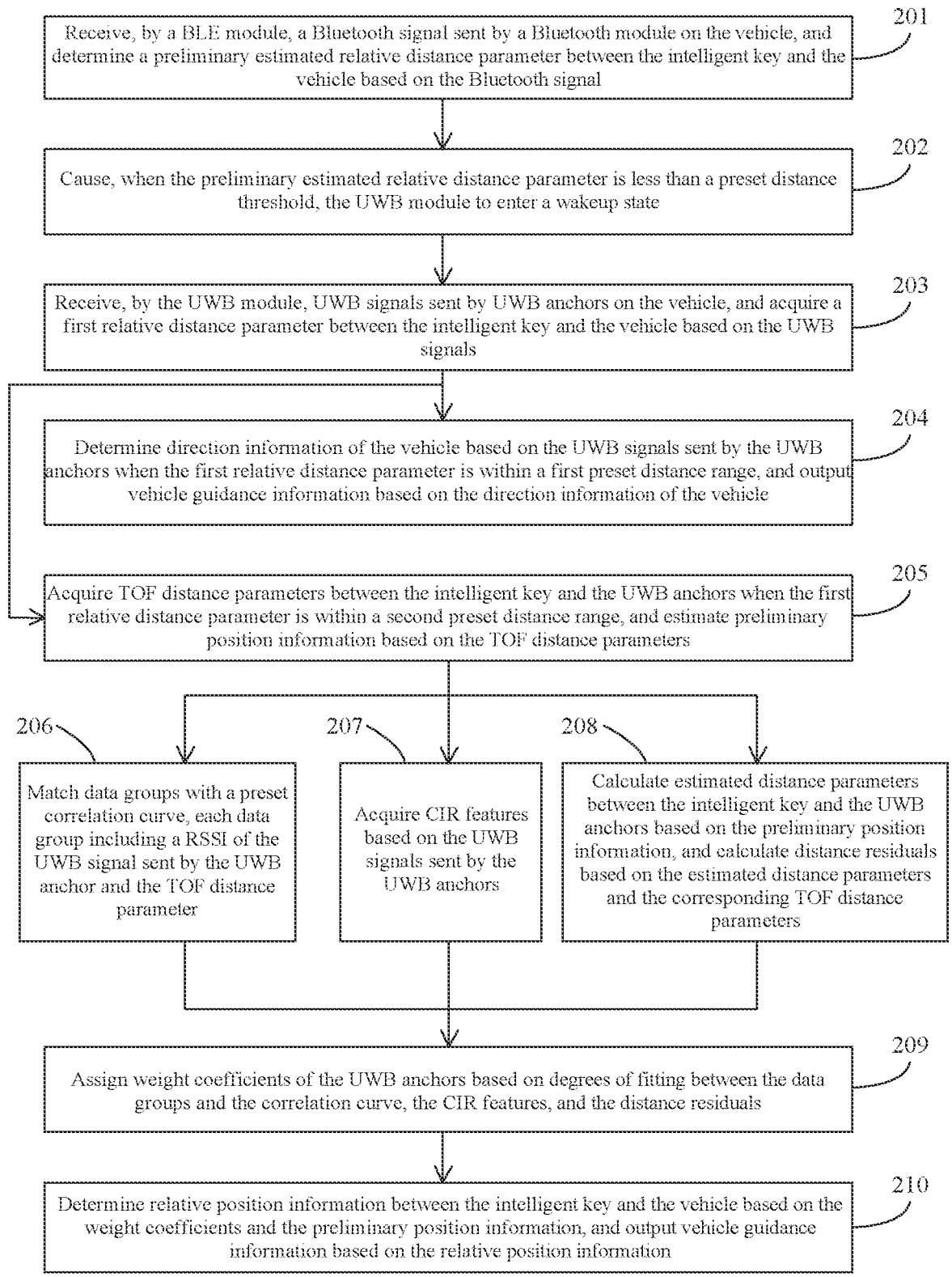
FIG. 2 is a flowchart of a method for positioning a vehicle based on UWB according to a second embodiment of the present disclosure.

In order to better understand the present disclosure, in a second embodiment of the present disclosure, a method for positioning a vehicle based on UWB is further provided, and the method is applied to an intelligent key. The intelligent key includes a UWB module and a BLE module. FIG. 2 is a schematic flowchart of the UWB-based vehicle positioning method provided in this embodiment. The UWB-based vehicle positioning method includes the following steps.

In step 201, a Bluetooth signal sent by a Bluetooth module configured on the vehicle is received by the BLE module, and a preliminary estimated relative distance parameter between the intelligent key and the vehicle is determined based on the Bluetooth signal.

In step 202, the UWB module is caused to enter a wakeup state when the preliminary estimated relative distance parameter is less than a preset distance threshold.

In step 203, UWB signals sent by UWB anchors configured on the vehicle are received by the UWB module, and a first relative distance parameter between the intelligent key and the vehicle is acquired based on the UWB signals.

In step 204, direction information of the vehicle is determined based on the UWB signals sent by the UWB anchors when the first relative distance parameter is within a first preset distance range, and vehicle guidance information is outputted based on the direction information of the vehicle.

In step 205, TOF distance parameters between the intelligent key and the UWB anchors are acquired when the first relative distance parameter is within a second preset distance range, and preliminary position information is estimated based on the TOF distance parameters.

In step 206, data groups formed by RSSIs of the UWB signals sent by the UWB anchors and the TOF distance parameters are matched with a preset correlation curve.

In step 207, CIR features are acquired based on the UWB signals sent by the UWB anchors.

In step 208, estimated distance parameters between the intelligent key and the UWB anchors are calculated based on the preliminary position information, and distance residuals are calculated based on the estimated distance parameters and the corresponding TOF distance parameters.

In step 209, weight coefficients of the UWB anchors are assigned based on degrees of fitting between the data groups and the correlation curve, the CIR features, and the distance residuals.

In step 210, relative position information between the intelligent key and the vehicle is determined based on the weight coefficients and the preliminary position information, and vehicle guidance information is outputted based on the relative position information.

It should be understood that sequence numbers of the steps in this embodiment do not mean execution sequences. The execution sequences of the steps should be determined based on functions and internal logic thereof, and should not constitute an only limitation on the implementation process of the embodiments of the present disclosure.

Figure 3:
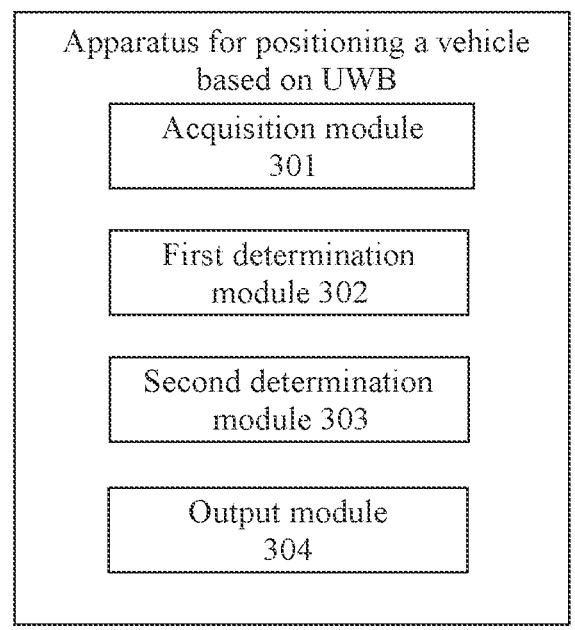
FIG. 3 is a schematic diagram of program modules of an apparatus for positioning a vehicle based on UWB according to a third embodiment of the present disclosure.

FIG. 3 shows a UWB-based vehicle positioning apparatus according to a third embodiment of the present disclosure. The UWB-based vehicle positioning apparatus is applied to an intelligent key, and the intelligent key includes a UWB module. As shown in FIG. 3, the UWB-based vehicle positioning apparatus includes: an acquisition module 301, a first determination module 302, a second determination module 303, and an output module 304.

The acquisition module 301 is configured to receive, based on the UWB module, UWB signals sent by UWB anchors configured on a vehicle, and acquire a first relative distance parameter between the intelligent key and the vehicle based on the UWB signals.

The first determination module 302 is configured to determine, when the first relative distance parameter is within a first preset distance range, direction information of the vehicle in conjunction with the UWB signals sent by the UWB anchors.

The second determination module 303 id configured to determine, when the first relative distance parameter is within a second preset distance range, relative position information between the intelligent key and the vehicle based on the UWB signals sent by the UWB anchors. A maximum distance parameter in the second preset distance range is less than a minimum distance parameter in the first preset distance range.

The output module 304 is configured to output vehicle guidance information based on the direction information of the vehicle or the relative position information.

In some embodiments, the intelligent key further includes a BLE module. The apparatus further includes a wakeup module configured to receive, based on the BLE module, a Bluetooth signal sent by a Bluetooth module configured on the vehicle; determine a second relative distance parameter between the intelligent key and the vehicle based on the Bluetooth signal; and cause, when the second relative distance parameter is less than a preset distance threshold, the UWB module to enter a wakeup state. The distance threshold is greater than a maximum distance parameter in the first preset distance range.

In an embodiment, the second determination module is configured to acquire TOF distance parameters between the intelligent key and the UWB anchors; estimate preliminary position information based on the TOF distance parameters; and determine the relative position information between the intelligent key and the vehicle according to the preliminary position information.

In an embodiment, when determining the relative position information between the intelligent key and the vehicle according to the preliminary position information, the second determination module acquires weight coefficients of the UWB anchors; and determines the relative position information between the intelligent key and the vehicle based on the weight coefficients and the preliminary position information.

In an embodiment, when acquiring weight coefficients of the UWB anchors, the second determination module is configured to match data groups formed by RSSIs of the UWB signals sent by the UWB anchors and the TOF distance parameters with a preset correlation curve, and assign the weight coefficients according to degrees of fitting between the data groups and the correlation curve. The correlation curve represents a corresponding relationship between reference distances and the RSSIs, In another embodiment, when acquiring weight coefficients of the UWB anchors, the second determination module is configured to acquire CIR features based on the UWB signals sent by the UWB anchors, and assign the weight coefficients of the UWB anchors according to the CIR features corresponding to the UWB anchors.

In yet another embodiment, when acquiring weight coefficients of the UWB anchors, the second determination module is configured to calculate estimated distance parameters between the intelligent key and the UWB anchors based on the preliminary position information; calculate distance residuals based on the estimated distance parameters and the corresponding TOF distance parameters, and assign the weight coefficients of the UWB anchors according to the distance residuals corresponding to the UWB anchors.

It is to be noted that the UWB-based vehicle positioning methods in the first and second embodiments may both be implemented based on the UWB-based vehicle positioning apparatus provided in this embodiment. Those of ordinary skill in the art can clearly understand that, for the convenience and simplicity of description, a specific operating process of the UWB-based vehicle positioning apparatus described in this embodiment may be obtained with reference to the corresponding process in the foregoing method embodiments. Details are not described herein again.

According to the UWB-based vehicle positioning apparatus provided in this embodiment, UWB signals sent by UWB anchors configured on a vehicle are received based on a UWB module, and a first relative distance parameter between the intelligent key and the vehicle based on the UWB signals are acquired. When the first relative distance parameter is within a first preset distance range, direction information of the vehicle is determined based on the UWB signals sent by the UWB anchors. When the first relative distance parameter is within a second preset distance range, relative position information between the intelligent key and the vehicle is determined based on the UWB signals sent by the UWB anchors. A maximum distance parameter in the second preset distance range is less than a minimum distance parameter in the first preset distance range. Vehicle guidance information is outputted based on the direction information of the vehicle or the relative position information. In the present disclosure, a UWB technology with strong penetration and a good anti-multipath reflection effect is used for vehicle searching guidance, which has high positioning accuracy and good robustness in covered parking lot application scenes, ensuring effectiveness of vehicle searching guidance.

Figure 4:
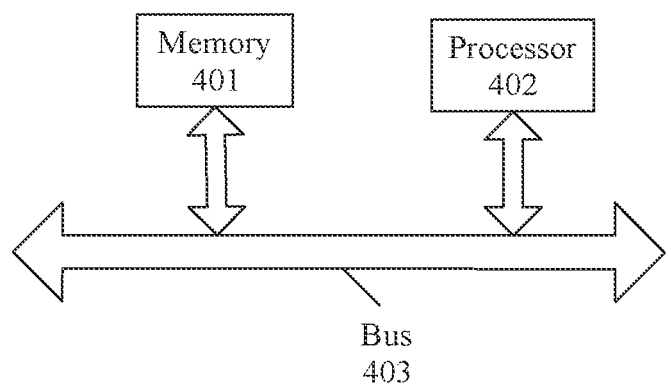
FIG. 4 is a schematic diagram of a hardware structure of an intelligent key according to a fourth embodiment of the present disclosure.

Referring to FIG. 4, FIG. 4 shows an intelligent key according to a fourth embodiment of the present disclosure. The intelligent key may be configured to implement the UWB-based vehicle positioning method in the foregoing embodiments. As shown in FIG. 4, the intelligent key mainly includes: a memory 401, a processor 402, a bus 403, and a computer program stored in the memory 401 and executable by the processor 402

The memory 401 and the processor 402 are connected through the bus 403. The processor 402, when executing the computer program, performs the UWB-based vehicle positioning method in the foregoing embodiments. One or more processors may be provided.

The memory 401 may be a high-speed random access memory (RAM), or may be a non-volatile memory such as a magnetic disk memory. The memory 401 is configured to store executable program code, and the processor 402 is coupled to the memory 401.

Further, an embodiment of the present disclosure further provides a non-transitory computer-readable storage medium. The computer-readable storage medium may be arranged in the intelligent key in the above embodiments. The computer-readable storage medium may be the memory in the embodiment shown in FIG. 4 above.

The computer-readable storage medium stores a computer program. When the program is executed by a processor, the UWB-based vehicle positioning method in the foregoing embodiments is implemented. Further, the computer-readable storage medium may alternatively be any medium that can store program code such as a USB flash disk, a mobile hard disk, a read-only memory (ROM), a RAM, a magnetic disk, or an optical disc.

In the several embodiments provided in the present disclosure, it should be understood that the apparatus and method disclosed may be implemented in other manners. For example, the apparatus embodiments described above are only illustrative. For example, the division of the modules is merely logical function division, and there may be other division manners in an actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between apparatuses or modules may be implemented in an electric form, a mechanical form, or other forms.

The modules described as separate parts may or may not be physically separate, and parts displayed as modules may or may not be physical modules, may be located at one position, or may be distributed on a plurality of network modules. Some or all of the modules may be selected according to actual requirements to achieve the objective of the solution of this embodiment.

In addition, the functional modules in the embodiments of the present disclosure may be integrated into one processing module, or each of the modules may exist alone physically, or two or more modules are integrated into one module. The integrated module may be implemented in a form of hardware or in a form of a software functional module.

The integrated module may be stored in a computer-readable storage medium when implemented in the form of the software functional module and sold or used as a separate product. Based on such an understanding, the technical solutions in the present disclosure essentially, or the part contributing to the prior art, or some of the technical solutions may be implemented in the form of a software product. The computer software product is stored in a readable storage medium, and includes several instructions for causing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a ROM, a RAM, a magnetic disk, or an optical disc.

It is to be noted that, to make the description brief, the foregoing method embodiments are expressed as a series of actions. However, those skilled in the art should appreciate that the present disclosure is not limited to the described action sequence, because according to the present disclosure, some steps may be performed in other sequences or performed simultaneously. In addition, those skilled in the art should also appreciate that all the embodiments described in the specification are preferred embodiments, and the related actions and modules are not necessarily mandatory to the present disclosure.

In the above embodiments, the descriptions of the embodiments have respective focuses. For a part that is not described in detail in one embodiment, refer to related descriptions in other embodiments.

The above are descriptions about the UWB-based vehicle searching guidance method and the related apparatus provided in the present disclosure. For those skilled in the art, there may be changes in specific embodiments and an application scope based on the ideas of the embodiments of the present disclosure. In summary, the content of this specification should not be understood as a limitation on the present application.

What is claimed is:

1. A method for positioning a vehicle based on an ultra-wideband (UWB), applied in an intelligent key including a UWB module, the method comprising:
receiving, by the UWB module, UWB signals sent by UWB anchors configured on the vehicle, and acquiring, based on the UWB signals, a first relative distance parameter between the intelligent key and the vehicle;
determining, when the first relative distance parameter is within a first preset distance range, direction information of the vehicle based on the UWB signals sent by the UWB anchors;
determining, when the first relative distance parameter is within a second preset distance range, relative position information between the intelligent key and the vehicle based on the UWB signals sent by the UWB anchors; wherein a maximum distance parameter in the second preset distance range is less than a minimum distance parameter in the first preset distance range; and
outputting vehicle guidance information based on the direction information or the relative position information of the vehicle.

2. The method as described in claim 1, wherein the intelligent key further includes a Bluetooth low energy (BLE) module, and prior to receiving, by the UWB module, the UWB signals sent by the UWB anchors configured on the vehicle, the method further comprises:
receiving, based by the BLE module, a Bluetooth signal sent by a Bluetooth module configured on the vehicle;
determining a second relative distance parameter between the intelligent key and the vehicle based on the Bluetooth signal; and
causing, when the second relative distance parameter is less than a preset distance threshold, the UWB module to enter a wakeup state, wherein the preset distance threshold is greater than a maximum distance parameter in the first preset distance range.

3. The method as described in claim 1, wherein the determining the relative position information between the intelligent key and the vehicle based on the UWB signals sent by the UWB anchors comprises:
acquiring time of flight (TOF) distance parameters between the intelligent key and the UWB anchors;
estimating preliminary position information based on the TOF distance parameters; and
determining the relative position information between the intelligent key and the vehicle according to the preliminary position information.

4. The method as described in claim 3, wherein the determining the relative position information between the intelligent key and the vehicle according to the preliminary position information comprises:
acquiring weight coefficients of the UWB anchors; and
determining the relative position information between the intelligent key and the vehicle based on the weight coefficients and the preliminary position information.

5. The method as described in claim 4, wherein the acquiring the weight coefficients of the UWB anchors comprises:
matching data groups with a preset correlation curve, wherein each data group includes a received signal strength indication (RSSI) of the UWB signal sent by a corresponding UWB anchor of the UWB anchors and the TOF distance parameter between the intelligent key and the corresponding UWB anchor, and the preset correlation curve represents a corresponding relationship between reference distances and RSSIs; and
assigning the weight coefficients according to degrees of fitting between the data groups and the preset correlation curve.

6. The method as described in claim 4, wherein the acquiring the weight coefficients of the UWB anchors comprises:
acquiring channel impulse response (CIR) features based on the UWB signals sent by the UWB anchors; and
assigning the weight coefficients according to the CIR features corresponding to the UWB anchors.

7. The method as described in claim 4, wherein the acquiring the weight coefficients of the UWB anchors comprises:
calculating estimated distance parameters between the intelligent key and the UWB anchors based on the preliminary position information;
calculating distance residuals based on the estimated distance parameters and the corresponding TOF distance parameters; and
assigning the weight coefficients according to the distance residuals corresponding to the UWB anchors.

8. An apparatus for positioning a vehicle based on an ultra-wideband (UWB), applied in an intelligent key including a UWB module, the apparatus comprising:
an acquisition module configured to receive, based on the UWB module, UWB signals sent by UWB anchors configured on the vehicle, and acquire, based on the UWB signals, a first relative distance parameter between the intelligent key and the vehicle;
a first determination module configured to determine, when the first relative distance parameter is within a first preset distance range, direction information of the vehicle based on the UWB signals sent by the UWB anchors;
a second determination module configured to determine, when the first relative distance parameter is within a second preset distance range, relative position information between the intelligent key and the vehicle based on the UWB signals sent by the UWB anchors, wherein a maximum distance parameter in the second preset distance range is less than a minimum distance parameter in the first preset distance range; and
an output module configured to output vehicle guidance information based on the direction information or the relative position information of the vehicle.

9. An intelligent key, comprising: a memory, a processor, and a computer program stored in the memory and executable by the processor, wherein the processor, when executing the computer program, performs the method as described in claim 1.

10. A non-transitory computer-readable storage medium, storing a computer program, wherein, when the computer program is executed by a processor, the method as described in claim 1 is performed.

* * * * *